I. LAZARUS.
PROJECTION SCREEN.
APPLICATION FILED JULY 18, 1912.

1,399,566

Patented Dec. 6, 1921.

Witnesses:
William H. Card
J. C. Schroder

Inventor
Isaac Lazarus
By Edgar S. Brettell.
Attorney.

UNITED STATES PATENT OFFICE.

ISAAC LAZARUS, OF BERLIN, GERMANY, ASSIGNOR TO PERLANTINO. O. CE. PE. G. M. B. H., OF BERLIN, GERMANY.

PROJECTION-SCREEN.

1,399,566. Specification of Letters Patent. Patented Dec. 6, 1921.

Application filed July 18, 1912. Serial No. 710,329.

(GRANTED UNDER THE PROVISIONS OF THE ACT OF MARCH 3, 1921, 41 STAT. L., 1313.)

*To all whom it may concern:*

Be it known that I, ISAAC LAZARUS, a subject of the Emperor of Germany, residing at 27, Waldemarstrasse, Berlin, in the German Empire, have invented certain new and useful Improvements in Projection-Screens, (for which I have filed applications in Great Britain Nos. 28,823 and 28,838, dated 21st December, 1911; Germany July 25th, 1911; Switzerland May 25th, 1912; France May 28th, 1912, Belgium May 29th, 1912,) of which the following is a specification.

The invention has for its object a projection screen for cinematographic projection and this projection screen is intended and suited for direct projections as generally used in cinematographic exhibitions.

The essence of the invention resides in the fact that clear glass beads are arranged by means of some suitable adhesive on a backing or support of any appropriate opaque material.

The support or backing for a projection screen in accordance with the invention may consist of paper, canvas, cardboard, pasteboard, wood or the like, but a support of stretched canvas has been found particularly suitable for this purpose.

Upon this support the layer of glass beads of appropriate granulation are arranged directly by a suitable binding medium such for example as Japan lacquer, the beads employed having a diameter of from ⅛ to 1¼ millimeters. The size of the beads employed depends more particularly upon the conditions governing the use of each particular screen. Thus for example screens provided with large beads are better suited for use in large halls and interiors owing to the coarser background which they provide while screens provided with beads of very small diameter are more suitable for smaller halls.

The adhesive employed for fixing the glass beads must be of such a kind that it produces a dull effect upon the support and is not liable to crack even after the screen has been in use for a long time. The adhesive should also present such elasticity that even when the screen is rolled up, as it must be during transport, it is not liable to crack; this is of great importance if the screen is to remain in good order.

The advantage presented by a screen in accordance with the invention as compared with other known screens resides in the fact that by its use, projections can be reproduced in undarkened rooms with all the adequate clearness and sharpness. In the case of cinematographic projections in darkened interiors however, it is possible, when the novel screen is used, to work with much smaller sources of light than with the projection screens hitherto employed. One advantage of this is a considerable saving of light, and a corresponding reduction in the working costs. Another important advantage in the reproduction of cinematographic pictures is that the employment of sources of light giving excessively glaring effects can be avoided which was not always possible when any of the known forms of projection screens were employed.

The novel projection screen presents these advantages because with such a screen the layer of clear glass beads arranged on the mat opaque support acts in such a manner that the individual glass beads reflect back the rays of light falling on to the projection screen almost totally and uniformly in all directions, so that no light is absorbed by the projection screen.

As compared with other known projection screens which are also intended to economize light, the novel projection screen is characterized on the one hand by the simplicity and cheapness of its manufacture and on the other hand by the fact that its backing is of opaque material such as ordinary canvas. A projection screen in accordance with the invention is therefore exactly as durable as the projection screens hitherto employed consisting of ordinary canvas, and it is in no way as sensitive as a glass screen. As moreover in a projection screen in accordance with the invention a metallic layer can be dispensed with without in any way impairing its efficacy, its utility cannot be impaired by such a metallic layer becoming dull as a result of oxidation for example.

A projection screen embodying the invention is illustrated in the accompanying drawing.

Figures 1, 2:
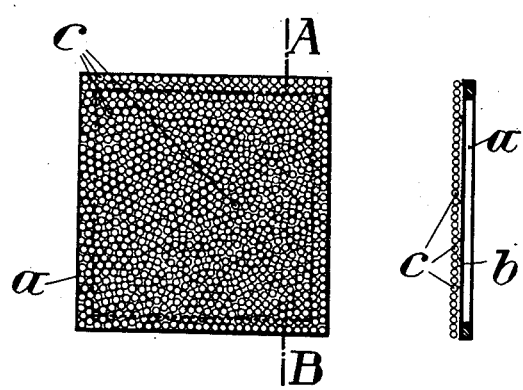
Figure 1 is a front elevation.
Fig. 2 is a section on the line A—B in Fig. 1.

In the drawing, *b* is the backing or support of the projection screen consisting of stretched canvas for example supported on a frame $a$ and $c$ are the glass beads applied to the packing $b$.

What I claim and desire to secure by Letters Patent of the United States is:—

1. A projection screen for use in connection with cinematograph and similar exhibitions, comprising an opaque foundation having its image display surface composed of a layer of glass beads.

2. A projection screen for use in connection with cinematograph and similar exhibitions, having a non-light-transmitting reflecting surface, and an image display surface thereon of a layer of small juxtaposed spherical transparent bodies.

3. A projection screen comprising a non-light-transmitting stretched fabric having its display surface provided with a layer of glass beads.

4. A projection screen, comprising a non-light-transmitting foundation having a layer of clear glass beads on its image display surface.

5. A projection screen comprising a non-light-transmitting foundation, a coating of Japan lacquer and a layer of glass beads adhering to said lacquer.

6. A projection screen comprising a non-light-transmitting fabric, a coating of Japan lacquer thereon and a layer of glass beads adhering thereto.

7. A projection screen, comprising a non-light-transmitting foundation fabric coated with Japan lacquer to which adheres a layer of transparent beads.

In testimony whereof I affix my signature in presence of two witnesses.

ISAAC LAZARUS.

Witnesses:
 HENRY HASPER,
 WOLDEMAR HAUPT.